United States Patent

Vera et al.

(10) Patent No.: US 10,291,163 B2
(45) Date of Patent: May 14, 2019

(54) CASCODE STRUCTURE FOR LINEAR REGULATORS AND CLAMPS

(71) Applicant: TEXAS INSTRUMENTS INCORPORATED, Dallas, TX (US)

(72) Inventors: Alejandro Vera, Richardson, TX (US); Shyamsunder Balasubramanian, Plano, TX (US); Toshio Yamanaka, Plano, TX (US); Toru Tanaka, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 232 days.

(21) Appl. No.: 15/142,219

(22) Filed: Apr. 29, 2016

(65) Prior Publication Data

US 2017/0317625 A1 Nov. 2, 2017

(51) Int. Cl.
*H02P 8/12* (2006.01)
*G05F 1/595* (2006.01)

(52) U.S. Cl.
CPC .............. *H02P 8/12* (2013.01); *G05F 1/595* (2013.01)

(58) Field of Classification Search
CPC . G05F 1/575; G05F 3/262; G05F 1/56; G05F 3/30; G05F 1/46; G05F 1/565; G05F 1/573; G05F 3/242; G05F 3/267; H03F 1/0261; H03F 2200/18; H03F 1/0266; H03F 3/45188; H03F 1/223; H03F 2200/15
See application file for complete search history.

(56) References Cited

U.S. PATENT DOCUMENTS

| 5,512,814 | A | * | 4/1996 | Allman | G05F 3/262 323/267 |
| 5,714,912 | A | * | 2/1998 | Fiedler | H03B 5/24 327/280 |
| 5,739,681 | A | * | 4/1998 | Allman | G05F 3/262 323/281 |
| 5,912,550 | A | * | 6/1999 | Sharpe-Geisler | G05F 1/575 323/273 |
| 5,936,467 | A | * | 8/1999 | Strickland | H03F 1/308 330/255 |
| 6,188,211 | B1 | * | 2/2001 | Rincon-Mora | G05F 1/575 323/273 |
| 6,265,856 | B1 | * | 7/2001 | Cali' | G05F 1/575 323/273 |
| 6,340,918 | B2 | * | 1/2002 | Taylor | G05F 1/56 323/314 |
| 6,703,813 | B1 | * | 3/2004 | Vladislav | G05F 1/575 323/270 |
| 6,897,717 | B1 | * | 5/2005 | Eddleman | G05F 3/262 327/108 |

(Continued)

*Primary Examiner* — Bickey Dhakal
(74) *Attorney, Agent, or Firm* — Lawrence J. Bassuk; Charles A. Brill; Frank D. Cimino

(57) ABSTRACT

A voltage regulator includes an output transistor, an error amplifier coupled to the output transistor, a cascode transistor coupled to the output transistor in series, and a cascode bias circuit coupled to the cascode transistor and the output transistor. The output transistor is configured to generate an output signal at a first voltage. The error amplifier is configured to receive a reference signal. The cascode bias circuit is configured to bias the cascode transistor such that, in response to a drain-to-source short circuit of the output transistor, the cascode transistor generates the output signal at the first voltage.

20 Claims, 2 Drawing Sheets

(56) References Cited

U.S. PATENT DOCUMENTS

| | | | |
|---|---|---|---|
| 6,977,491 B1* | 12/2005 | Caldwell | G05F 1/573 323/282 |
| 7,113,044 B2* | 9/2006 | Wang | G05F 3/262 330/288 |
| 7,129,684 B2* | 10/2006 | Park | H02M 1/36 323/222 |
| 7,502,719 B2* | 3/2009 | Moraveji | G05F 1/575 702/185 |
| 7,541,796 B2* | 6/2009 | Imtiaz | G05F 1/575 323/280 |
| 7,564,289 B2* | 7/2009 | Imura | H03K 3/013 327/333 |
| 7,646,574 B2* | 1/2010 | Imura | G05F 1/575 323/274 |
| 7,656,224 B2* | 2/2010 | Perez | H03F 1/0261 323/282 |
| 7,688,987 B2* | 3/2010 | Boor | H03F 3/185 330/311 |
| 7,746,149 B2* | 6/2010 | Imura | H03K 3/013 327/333 |
| 7,907,003 B2* | 3/2011 | Pulijala | G05F 1/575 323/313 |
| 8,022,770 B1* | 9/2011 | Wang | H03F 1/0261 330/296 |
| 8,183,911 B2* | 5/2012 | Kundu | H03K 17/00 327/407 |
| 8,228,125 B2* | 7/2012 | Heijden | H03F 1/223 330/311 |
| 8,237,422 B2* | 8/2012 | Singh | H02M 1/088 323/282 |
| 8,669,753 B2* | 3/2014 | Heng | G05F 1/575 323/282 |
| 8,866,341 B2* | 10/2014 | Riederer | G05F 1/56 307/80 |
| 9,024,602 B2* | 5/2015 | Fort | G05F 1/46 323/280 |
| 9,438,175 B2* | 9/2016 | Onizuka | H03F 1/223 |
| 2001/0024140 A1* | 9/2001 | Taylor | G05F 1/56 330/292 |
| 2002/0171403 A1* | 11/2002 | Lopata | G05F 3/242 323/220 |
| 2002/0181180 A1* | 12/2002 | Ivanov | F16D 31/02 361/87 |
| 2003/0098738 A1* | 5/2003 | Descombes | G05F 3/262 327/538 |
| 2003/0202669 A1* | 10/2003 | Boor | H03F 3/185 381/111 |
| 2004/0140845 A1* | 7/2004 | Eberlein | G05F 1/575 327/541 |
| 2006/0038618 A1* | 2/2006 | Wang | G05F 3/262 330/288 |
| 2006/0208770 A1* | 9/2006 | Perez | H03F 1/0261 327/108 |
| 2007/0040603 A1* | 2/2007 | Shor | G05F 1/565 327/543 |
| 2007/0210852 A1* | 9/2007 | Imura | H03K 3/35613 327/333 |
| 2008/0180071 A1* | 7/2008 | Moraveji | G05F 1/575 323/268 |
| 2009/0121694 A1* | 5/2009 | Wyatt | G05F 1/46 323/275 |
| 2009/0195290 A1* | 8/2009 | Moraveji | G05F 1/575 327/331 |
| 2009/0237161 A1* | 9/2009 | Fagg | H03F 3/45242 330/253 |
| 2009/0289686 A1* | 11/2009 | Imura | H03K 3/35613 327/333 |
| 2010/0283439 A1* | 11/2010 | Singh | H03K 17/102 323/282 |
| 2011/0025280 A1* | 2/2011 | Kimura | G05F 1/575 323/282 |
| 2011/0090002 A1* | 4/2011 | Kundu | H03K 17/00 327/544 |
| 2012/0146603 A1* | 6/2012 | Heng | G05F 1/575 323/282 |
| 2012/0176109 A1* | 7/2012 | Riederer | G05F 1/56 323/282 |
| 2013/0257401 A1* | 10/2013 | Fort | G05F 1/575 323/280 |
| 2015/0362936 A1* | 12/2015 | Patel | G05F 1/575 323/280 |
| 2017/0317619 A1* | 11/2017 | Balasubramanian | H03K 17/6871 |

* cited by examiner

CASCODE STRUCTURE FOR LINEAR REGULATORS AND CLAMPS

BACKGROUND

Voltage regulators are in many electrical systems to supply power to components of the system at a steady voltage. In many cases, voltage regulators are designed to supply power to the electrical components at a voltage that is lower than the main system power supply to prevent damage that may be caused by the higher voltage of the main power supply. In conventional voltage regulators, an error amplifier in a negative feedback loop with a single output transistor may be utilized to generate the desired voltage. This transistor is also connected to the main power supply. More particularly, in the conventional voltage regulator, the output of the error amplifier supplies the gate of the transistor while the main power supply supplies the drain of the transistor. The output voltage of the voltage regulator is supplied by the source of the transistor. Thus, if the transistor develops a drain-to-source short circuit, the low voltage components in the system that the voltage regulator is supplying will be shorted to the main power supply.

SUMMARY

The problems noted above are solved in large part by systems and methods for regulating a voltage utilizing safety circuitry. In some embodiments, a voltage regulator includes an output transistor, an error amplifier coupled to the output transistor, a cascode transistor coupled to the output transistor in series, and a cascode bias circuit coupled to the cascode transistor and the output transistor. The output transistor is configured to generate an output signal at a first voltage. The error amplifier is configured to receive a reference signal. The cascode bias circuit is configured to bias the cascode transistor such that, in response to a drain-to-source short circuit of the output transistor, the cascode transistor generates the output signal at the first voltage.

Another illustrative embodiment is a method for regulating voltage. The method may include receiving, by a cascode transistor of a voltage regulator, a power supply voltage from a power supply at a first voltage. The method may also include biasing an output transistor that is connected in series with the cascode transistor such that, in response to a drain-to-source short circuit of the cascode transistor, the output transistor generates an output signal at a second voltage. The method may also include biasing the cascode transistor such that, in response to a drain-to-source short circuit of the output transistor, the cascode transistor generates the output signal at the second voltage.

Yet another illustrative embodiment is a control system that includes a microcontroller (MCU), a power supply unit (PSU), and a voltage regulator. The MCU is configured to implement state changes for the control system. The PSU is configured to generate a power supply at a first voltage. The voltage regulator is configured to receive the power supply from the PSU and generate a MCU power supply at a second voltage to power the MCU. The voltage regulator includes a cascode transistor coupled to an output transistor in series and a bias circuit. The bias circuit is configured to bias the cascode transistor such that, in response to a drain-to-source short circuit of the output transistor, the cascode transistor generates the MCU power supply at the second voltage.

BRIEF DESCRIPTION OF THE DRAWINGS

For a detailed description of various examples, reference will now be made to the accompanying drawings in which.

NOTATION AND NOMENCLATURE

Figure 1:
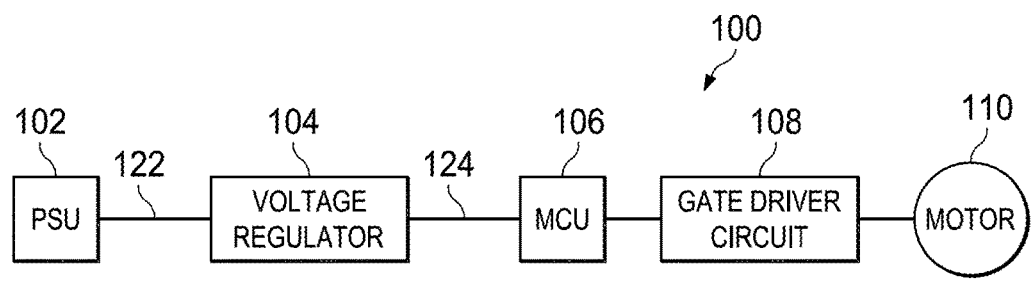
FIG. 1 shows an illustrative block diagram of a control system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In many electrical systems voltage regulators, such as low-dropout (LDO) regulators, may be utilized to supply power to components of the system at a steady voltage. In many cases, these voltage regulators are designed to supply power to the electrical components at a voltage that is lower, and in some cases much lower, than the main system power supply because the electrical components receiving the power may be damaged by the higher voltage of the main power supply. For example, in a power steering system in an automobile, a microcontroller may control other components of the system such that an electric motor enables the power steering. The main power supply for the power steering system may be supplied at 60V which may destroy and/or damage the microcontroller. Thus, the voltage regulator may receive the main power supply and generate a power supply for the microcontroller at the microcontroller's desired voltage (e.g., 5-6V).

In conventional voltage regulators, an error amplifier in a negative feedback loop with a single output transistor may be utilized to generate the desired voltage. This transistor is also connected to the main power supply. More particularly, in the conventional voltage regulator, the output of the error amplifier supplies the gate of the transistor while the main power supply supplies the drain of the transistor. The output voltage of the voltage regulator is supplied by the source of the transistor. Thus, if the transistor develops a drain-to-source short circuit, the low voltage components in the system that the voltage regulator is supplying (e.g., the microcontroller) will be shorted to the main power supply. This may cause damage that may cause the entire system to fail. Therefore, it is desirable to design a voltage regulator with a safety mechanism that reduces the risk of shorting the low voltage components in the system to the main power supply.

In accordance with the disclosed principles, a voltage regulator may include an output transistor and a cascode transistor in a cascode configuration. The cascode transistor may be biased such that, in response to a drain-to-source short circuit of the output transistor, the cascode transistor generates the output signal to supply the low voltage components. Similarly, the output transistor may be biased such that, in response to a drain-to-source short circuit of the cascode transistor, the output transistor generates the output signal to supply the low voltage components. If neither the output transistor nor the cascode transistor has a drain-to-source short circuit, the cascode transitory and the output transistor may be biased such that the output transistor generates the output signal to supply the low voltage components. In this way, risk of damage to the low voltage components in the system due to a short of those components to the main power supply is reduced.

FIG. 1 shows an illustrative block diagram of a control system 100 in accordance with various embodiments. Control system 100 may comprise power supply unit (PSU) 102, voltage regulator 104, microcontroller (MCU) 106, gate-driver circuit 108 and motor 110. In some embodiments, control system 100 is configured to control the driving of motor 110. While the control system 100 depicted in FIG. 1 is configured to control motor 110, in alternative embodiments, control system 100 may be configured to control any type of device including any type of circuit.

PSU 102 may be any type of electrical device configured to generate a power supply 122 at a given voltage (e.g., 60V) to provide electric energy for the remaining components of control system 100 (i.e., voltage regulator 104, MCU 106, gate-driver circuit 108) to operate. PSU 102 may be any type of power supply including a DC power supply, an AC-to-DC power supply, a linear regulator, an AC power supply, a switched-mode power supply, an uninterruptible power supply (UPS), a battery, etc.

Voltage regulator 104 is configured to receive the power supply 122 from PSU 102 and generate an output signal 124 at a constant voltage. In the embodiment depicted in FIG. 1, voltage regulator 104 is designed to generate output signal 124 to supply power to MCU 106, and thus, the output signal 124 may be considered a MCU power supply. In alternative embodiments, voltage regulator 104 may be designed to supply power to other components of control system 100 or any other type of electrical component or system. In some embodiments, voltage regulator 104 is a low-dropout (LDO) regulator, but may be any type of regulator including a DC-DC Buck converter, etc. For example, voltage regulator 104 may receive the power supply 122 at 60V and generate output signal 124 at a steady 5-6V to power MCU 106. Thus, the voltage regulator 104 may convert the voltage of power supply 122 supplied by PSU 102 to a lower voltage as output signal 124. In other words, the voltage of power supply 122 may be greater than the voltage of output signal 124.

MCU 106 may be configured to implement state changes for the devices of control system 100. For example, MCU 106 may be configured to control the overall operation of the control system 100 by implementing state changes for gate-driver circuit 108. MCU 106 may be any type of microcontroller or other electrical processing device and may include a processor core, memory, and programmable input/output peripherals. The memory of MCU 106 may be in the form of flash, read-only memory, random access memory, or any other type of memory or combination of types of memory. The components of MCU 106 may be implemented as a system on a chip (SoC) on a single integrated circuit. In alternative embodiments, MCU 106 may be implemented across multiple integrated circuits. Gate-driver circuit 108 may be configured to drive electric motor 110 in response to signals received from MCU 106. In other words, gate-driver circuit 108 may drive electric motor 110 based on the state changes in the gate-driver circuit imposed by MCU 106. Electric motor 110 may be any type of electric motor including a brushless DC electric motor, and more particularly a stepper motor.

In some embodiments, control system 100 may be implemented in automobiles. For example, control system 100 may be utilized to control the power steering of an automobile. In other embodiments, control system 100 may be implemented in other control systems. Because, in some embodiments, the MCU 106 or other electrical component being supplied by the voltage regulator 104 may be damaged by the level of voltage supplied by PSU 102 as power supply 122, it may be useful to provide safety mechanisms to reduce the risk that the voltage regulator 104 fails to lower the voltage supplied by PSU 102. For example, a short circuit in a transistor of a conventional voltage regulator may prevent the conventional voltage regulator from generating the output signal 124 at the desired voltage. Therefore, voltage regulator 104 may contain a safety mechanism to reduce that risk.

Figure 2:
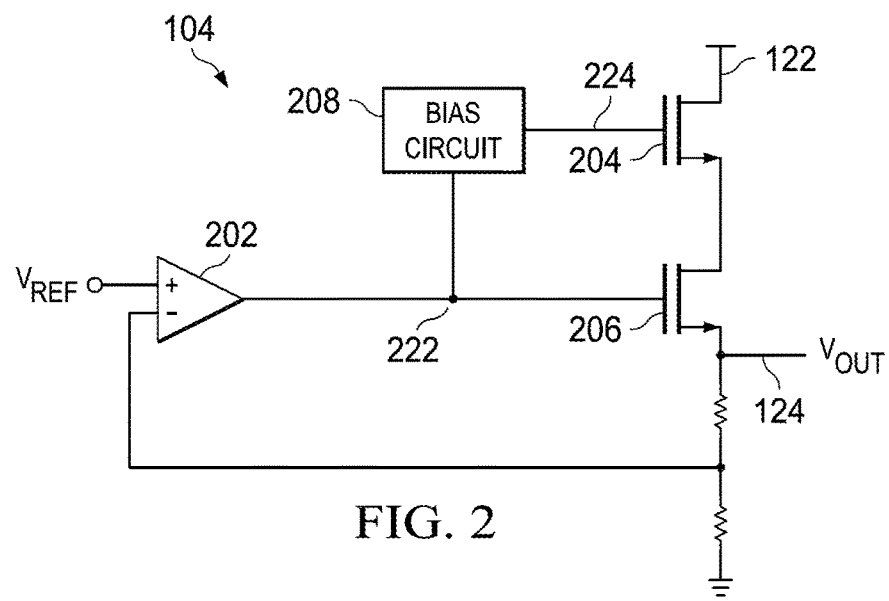
FIG. 2 shows an illustrative block diagram of a voltage regulator in accordance with various embodiments.

FIG. 2 shows an illustrative block diagram of voltage regulator 104 in accordance with various embodiments. Voltage regulator 104 may include error amplifier 202 having a non-inverting input receiving a reference voltage Vref, an inverting input coupled to between two resistors, and an output 222, cascode transistor 204 having a control input 224, an input coupled to the voltage of the power supply 102, and an output, output transistor 206 having a control input coupled to the output 222 of the error amplifier, an input coupled to the output of the cascode transistor, and a regulated output coupled to the output signal 124, and cascode bias circuit 208 having an input coupled to the output 222 of the error amplifier and the control input of the output transistor, and an output 224 coupled to the control input of the cascode transistor 204. Error amplifier 202, sometimes referred to as a differential amplifier, may be an operational amplifier (op-amp) implementing negative feedback. For example, error amplifier 202 may be configured to receive a reference signal at a voltage, $V_{REF}$, that is correlated with the desired voltage of the output signal 124, $V_{OUT}$, as error amplifier 202's non-inverting input while the output of the error amplifier 202, after being received by output transistor 206, is error amplifier 202's inverting input.

The output transistor 206 and the cascode transistor 204 may each be a field-effect transistor (FET) and more particularly may be an n-channel metal-oxide semiconductor field-effect (NMOS) transistor. In alternative embodiments, output transistor 206 and cascode transistor 204 may be any other type of transistor including a p-channel metal-oxide-semiconductor field-effect (PMOS) transistor, a p-type junction gate field-effect transistor (PJFET), a n-type junction gate field-effect transistor (NJFET), and a bipolar junction transistor (BJT) (including PNP and NPN transistors). The drain of cascode transistor may be directly connected to the PSU 122; therefore, the drain of cascode transistor 204 may receive power supply 122. The source of cascode transistor 204 may be directly connected to the drain of output transistor 206. Thus, cascode transistor 204 and output transistor 206 may be configured with a cascode structure. The gate of output transistor 206 is connected with error amplifier 202 while the source of output transistor 206 provides the output signal 124 (i.e., generates the output signal 124) and, as discussed previously, is connected with the inverting input of error amplifier 202. Thus, error amplifier 202 biases output transistor 206. The gate of cascode transistor 204 is connected via connection 224 with bias circuit 208. Thus, bias circuit 202 biases cascode transistor 206. Bias circuit 208 is also connected with the output of error amplifier 202 and the gate of output transistor 206 via node 222.

During normal operations (i.e., when neither the cascode transistor 204 nor the output transistor 206 has a drain-to-source short circuit), the bias circuit 208 may be configured to bias the cascode transistor and the error amplifier 202 may be configured to bias the output transistor 206 such that the output signal 124 is at a desired voltage (e.g., 5-6V) to supply the MCU 106. Furthermore, if the output transistor 206 develops a drain-to-source short circuit, then the source of the cascode transistor 204 ultimately provides the output signal 124 through the drain-to-source short circuited output transistor 206. Thus, the bias circuit 208 may also be configured to bias the cascode transistor 204 such that, in response to a drain-to-source short circuit of the output transistor 206, the cascode transistor 204 generates the output signal 124 at the same desired voltage (e.g., 5-6V) that the output transistor 206 generates when voltage regulator 104 is operating normally (i.e., when neither the cascode transistor 204 nor the output transistor 206 has a drain-to-source short circuit). If the cascode transistor 204 develops a drain-to-source short circuit, then the drain of the output transistor 206 is connected to the power supply 122 through the short circuited cascode transistor 204. Hence, the error amplifier 202 may be configured to bias the output transistor 206 such that, in response to a drain-to-source short circuit of the cascode transistor 204, the output transistor 206 generates the same desired voltage (e.g., 5-6V) that the output transistor 206 generates when voltage regulator 104 is operating normally (i.e., when neither the cascode transistor 204 nor the output transistor 206 has a drain-to-source short circuit). In this way, the voltage regulator 104 may provide the same voltage in output signal 124 whether either the cascode transistor 204 or the output transistor 206 develops a drain-to-source short circuit or if neither the cascode transistor 204 nor the output transistor 206 has a drain-to-source short circuit. Therefore, a safety mechanism is built into the voltage regulator 104 that reduces the risk that the voltage regulator 104 fails to lower the voltage supplied by PSU 102. Hence, the risk of damaging other components of the control system 100 is also reduced.

Figure 3:
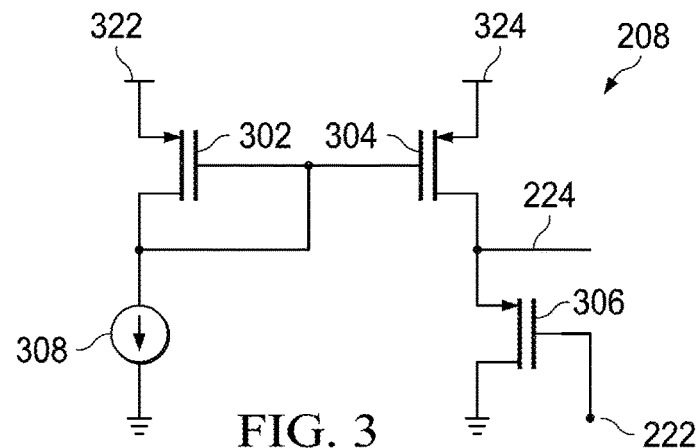
FIG. 3 shows an illustrative block diagram of a bias circuit in accordance with various embodiments.

FIG. 3 shows an illustrative block diagram of bias circuit 208 in accordance with various embodiments. Bias circuit 208 may include transistors 302-306 and current source 308. Transistors 302-306 may each be a FET and more particularly may be a PMOS transistor. In alternative embodiments, transistors 302-306 may be any other type of transistor including a NMOS transistor, a PJFET, a NJFET, and a BJT (including PNP and NPN transistors). The source of transistor 302 may be connected to an internal voltage supply 322. Similarly, the source of transistor 304 may be connected to an internal voltage supply 324. In some embodiments, internal voltage supplies 322-324 are supplied from the same source and/or have the same voltage. The internal voltage supplies 322-324 may have a voltage (e.g., 12V) that is greater than the voltage of output signal 124 and less than the voltage of power supply 122. The drain of transistor 302 may be connected to the current source 308 and the gate of both the transistor 302 and the transistor 304. Thus, the current source 308 may also be connected to the gates of transistors 302-304. Additionally, the gate of transistor 302 may be connected to the gate of transistor 304. The drain of transistor 304 is connected, via connection 224 to the gate of cascode transistor 204 to bias cascode transistor 204. The drain of transistor 304 is also connected to the source of transistor 306. The drain of transistor 306 is connected to ground while the gate of transistor 306 is connected to the output of error amplifier 202 and the gate of output transistor 206 via node 222. This configuration may provide the bias that enables bias circuit 208 to bias cascode transistor 204 such that, in response to a drain-to-source short circuit of the output transistor 206, the cascode transistor 204 generates the output signal 124 at the same desired voltage (e.g., 5-6V) that the output transistor 206 generates when voltage regulator 104 is operating normally (i.e., when neither the cascode transistor 204 nor the output transistor 206 has a drain-to-source short circuit).

Figure 4:
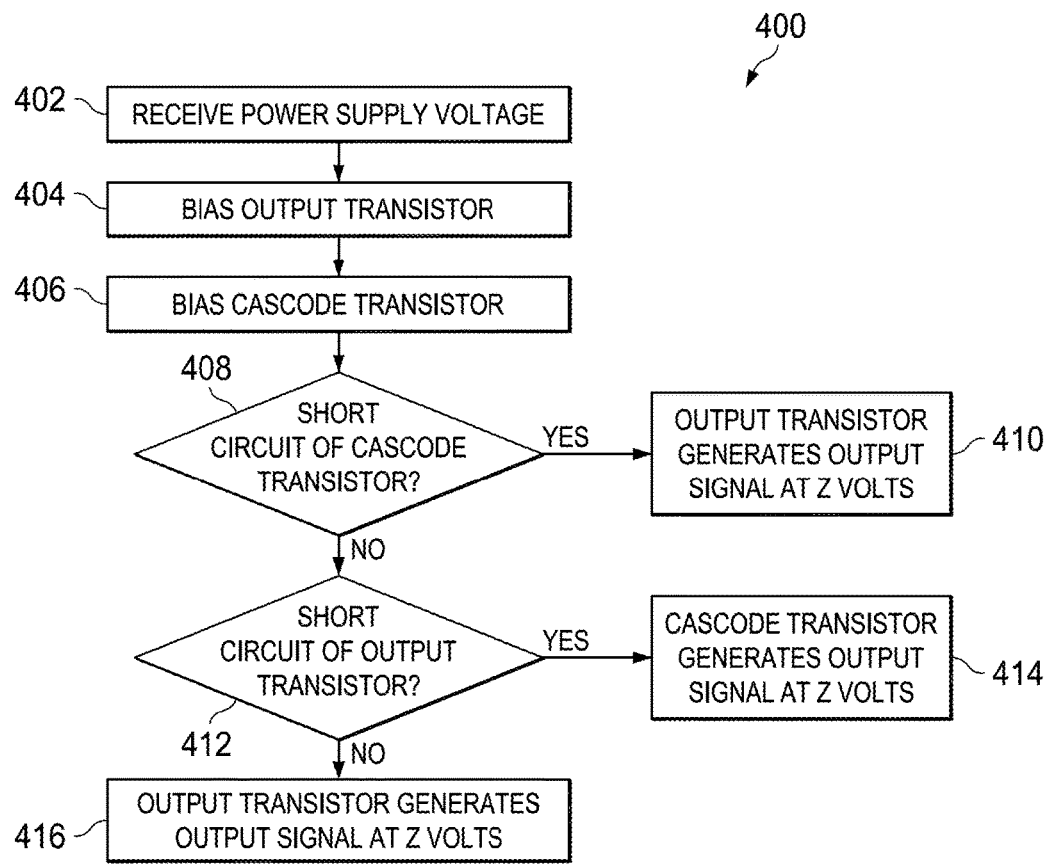
FIG. 4 shows an illustrative flow diagram of a method for regulating voltage in accordance with various embodiments.

FIG. 4 shows an illustrative flow diagram of a method 400 for regulating voltage in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400, as well as other operations described herein, can be performed by voltage regulator 104 and implemented by a processor executing instructions stored in a non-transitory computer readable storage medium.

The method 400 begins in block 402 with receiving a power supply voltage, such as power supply 122. In some embodiments, the power supply voltage is received by a voltage regulator, such as voltage regulator 104, from a power supply unit, such as PSU 102. For example, the voltage regulator 104 may receive a power supply at 60V. The method 400 continues in block 404 with biasing an output transistor, such as output transistor 206 of voltage regulator 104. For example, the output transistor 206 may be biased by a negative feedback error amplifier, such as error amplifier 202. In block 406, the method 400 continues with biasing a cascode transistor, such as cascode transistor 204 of voltage regulator 104. For example, the cascode transistor 204 may be biased by cascode bias circuit 208.

The method 400 continues in block 408 with determining whether the cascode transistor has developed a short circuit, such as a drain-to-source short circuit. If in block 408 a determination is made that the cascode transistor has developed a short circuit, such as a drain-to-source short circuit, then the method 400 continues in block 410 with generating, by the output transistor an output signal, such as output signal 124, at a desired voltage (e.g., 5-6V). Thus, the output transistor is biased such that, in response to the cascode transistor having a drain-to-source short circuit, the output transistor generates the output signal at the desired voltage (e.g., 5-6V). In some embodiments, the desired voltage of the output signal is less than the received power supply voltage. If in block 408 a determination is made that the cascode transistor has not developed a short circuit then the method 400 continues in block 412 with determining whether the output transistor has developed a short circuit, such as a drain-to-source short circuit.

If in block 412 a determination is made that the output transistor has developed a short circuit, such as a drain-to-source short circuit, then the method 400 continues in block 414 with generating, by the cascode transistor the output signal, such as output signal 124, at the same desired voltage (e.g., 5-6V) as generated by the output transistor in block 410. Thus, the cascode transistor is biased such that, in response to the output transistor having a drain-to-source short circuit, the cascode transistor generates the output signal at the desired voltage (e.g., 5-6V). If in block 412 a determination is made that the output transistor has not developed a short circuit then the method 400 continues in block 416 with generating, by the output transistor the output signal, such as output signal 124, at the same desired voltage (e.g., 5-6V) as generated by the output transistor in block 410 and/or the cascode transistor in block 414. Thus, the output transistor and the cascode transistors are biased such that, in response to neither the output transistor nor the cascode transistor have a drain-to-source short circuit, the output transistor generates the output signal at the desired voltage. (e.g., 5-6V).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A voltage regulator, comprising:
   a voltage supply and circuit ground;
   an output transistor having a control input, an input coupled to the voltage supply, and a regulated output, the output transistor being configured to generate an output signal at a first voltage at the regulated output;
   an error amplifier having an output coupled to the control input of the output transistor and configured to receive a reference signal;
   a cascode transistor having a control input, the cascode transistor being coupled to the output transistor in series between the voltage supply and the output transistor; and
   a cascode bias circuit having an input connected to the output of the error amplifier and the control input of the output transistor, and having an output connected to the control input of the cascode transistor, the cascode bias circuit configured to bias the cascode transistor such that, in response to a drain-to-source short circuit of the output transistor, the cascode transistor generates the output signal at the first voltage.

2. The voltage regulator of claim 1 in which the cascode bias circuit is directly connected to a gate of the cascode transistor and the error amplifier is directly connected to a gate of the output transistor.

3. The voltage regulator of claim 2 in which the error amplifier is configured to bias the output transistor such that, in response to the drain-to-source short circuit of the output transistor, the cascode transistor generates the output signal at the first voltage.

4. The voltage regulator of claim 1 in which a source of the cascode transistor is directly connected to a drain of the output transistor.

5. The voltage regulator of claim 1 in which a drain of the cascode transistor is directly connected to the voltage supply at a second voltage, the second voltage being greater than the first voltage.

6. The voltage regulator of claim 1 in which the bias circuit comprises:
   a current source;
   a first p-type metal oxide semiconductor (PMOS) transistor, a drain of the first PMOS transistor connected to the current source;
   a second PMOS transistor, a gate of the second PMOS transistor connected to the current source and a gate of the first PMOS transistor and a drain of the second PMOS transistor is connected to a gate of the cascode transistor; and
   a third PMOS transistor, a source of the third PMOS transistor connected to the drain of the second PMOS transistor, and a gate of the third PMOS transistor connected to a gate of the output transistor.

7. The voltage regulator of claim 6 in which a source of the first PMOS transistor and a source of the second PMOS transistor are connected to an internal voltage supply at a second voltage, the second voltage being greater than the first voltage.

8. The voltage regulator of claim 1 in which the error amplifier is further configured to receive a signal from a source of the output transistor as an inverting input and the reference signal as a non-inverting input.

9. The voltage regulator of claim 1 in which the output transistor and the cascode transistor are n-type metal oxide semiconductor (NMOS) transistors.

10. A method of regulating voltage comprising:
    receiving in an output transistor, by a series coupled cascode transistor of a voltage regulator, a power supply voltage from a power supply at a first voltage;
    biasing the output transistor that is connected in series with the cascode transistor with an output of an error amplifier such that, in response to a drain-to-source short circuit of the cascode transistor, the output transistor generates an output signal at a second regulated voltage; and
    biasing the cascode transistor with the output of the error amplifier such that, in response to a drain-to-source short circuit of the output transistor, the cascode transistor generates the output signal at the second regulated voltage.

11. The method of claim 10 including biasing the output transistor and the cascode transistor such that, in response to neither the output transistor nor the cascode transistor having a drain-to-source short circuit, the output transistor generates the output signal at the second regulated voltage.

12. The method of claim 10 in which the first voltage is greater than the second regulated voltage.

13. A control system, comprising:
    a microcontroller (MCU) configured to implement state changes for the control system;
    a power supply unit (PSU) configured to generate a power supply at a first voltage; and
    a voltage regulator configured to receive the power supply from the PSU and generate a MCU power supply at a second voltage to power the MCU, the voltage regulator including:
    a cascode transistor coupled to an output transistor in series between the power supply unit and the output transistor and having a control input;

an error amplifier having a voltage reference input, a feedback input coupled to an output of the output transistor, and an output coupled to the input of the output transistor; and a bias circuit having an input coupled to the output of the error amplifier and an output coupled to the cascode transistor, the bias circuit being configured to bias the cascode transistor such that, in normal operation the output transistor generates the output signal to supply the microcontroller, and in response to a drain-to-source short circuit of the output transistor, the cascode transistor generates the MCU power supply at the second voltage.

14. The control system of claim 13, including:

an electric motor; and a gate-driver circuit configured to drive the electric motor in response to signals received from the MCU.

15. The control system of claim 13 in which the voltage regulator includes an error amplifier configured to bias the output transistor such that, in response to a drain-to-source short circuit of the cascode transistor, the output transistor generates the MCU power supply at the second voltage.

16. The control system of claim 15 in which the error amplifier is configured to bias the output transistor and the bias circuit is configured to bias the cascode transistor such that, in response to neither the output transistor nor the cascode transistor having a drain-to-source short circuit, the output transistor generates the MCU power supply at the second voltage.

17. The control system of claim 13 in which the first voltage is greater than the second voltage.

18. The control system of claim 13 in which the voltage regulator is a low-dropout regulator (LDO).

19. The control system of claim 13 in which the bias circuit includes:

a current source;

a first p-type metal oxide semiconductor (PMOS) transistor, a drain of the first PMOS transistor connected to the current source;

a second PMOS transistor, a gate of the second PMOS transistor connected to the current source and a gate of the first PMOS transistor and a source of the second PMOS transistor is connected to a gate of the cascode transistor; and a third PMOS transistor, a source of the third PMOS transistor connected to a drain of the second PMOS transistor, and a gate of the third PMOS transistor connected to a gate of the output transistor.

20. The control system of claim 19 in which a source of the first PMOS transistor and a source of the second PMOS transistor are connected to an internal voltage supply at a third voltage, the third voltage being less than the first voltage and greater than the second voltage.

* * * * *